United States Patent [19]

Gabano et al.

[11] Patent Number: 4,478,920
[45] Date of Patent: Oct. 23, 1984

[54] LITHIUM CELL HAVING A SOLID ELECTROLYTE CONSTITUTED BY A CONDUCTIVE VITREOUS COMPOUND

[75] Inventors: Jean-Paul Gabano, Poitiers; Jean-Pierre Duchange, La Villedieu du Clain, both of France

[73] Assignee: GIPELEC, Levallois-Perret, France

[21] Appl. No.: 484,688

[22] Filed: Apr. 13, 1983

[30] Foreign Application Priority Data

Apr. 16, 1982 [FR] France ............................ 82 06560

[51] Int. Cl.³ ............................................. H01M 6/18
[52] U.S. Cl. ....................................... 429/191; 429/193
[58] Field of Search ........................ 429/191, 193, 104

[56] References Cited

U.S. PATENT DOCUMENTS 4,268,587 5/1981 Farrington et al. ................. 429/193
4,288,505 9/1981 Joshi et al. ........................... 429/191
4,331,750 5/1982 Malugani et al. .................... 429/193

FOREIGN PATENT DOCUMENTS 68307 1/1983 European Pat. Off. ............ 429/191
28472 3/1981 Japan ................................... 429/191

Primary Examiner—Donald L. Walton
Assistant Examiner—Stephen J. Kalafut
Attorney, Agent, or Firm—Kenyon & Kenyon

[57] ABSTRACT

The electrolyte is constituted by a conductive vitreous compound having the formula $aP_2S_5$, $bLi_2S$, $cLiX$, where X represents chlorine, bromine, or iodine, and where a, b, and c are numbers chosen so that the ratio $b/(a+b)$ lies between 0.61 and 0.70, and so that the ratio $c/(a+b+c)$ is less than or equal to a limit corresponding to the solubility in vitreous phase of LiX in the compound $aP_2S_5$, $bLi_2S$, with the positive active material comprising 20% to 80% by volume solid electrolyte together with an electron conductor, the improvement wherein a substance chosen from the halogens and the chalcogens is included in the electrolyte in order to produce an in situ chemical reaction at the lithium electrolyte interface thereby creating an ionically conductive bonding layer comprising a lithium halogenide or chalcogenide.

7 Claims, 2 Drawing Figures

LITHIUM CELL HAVING A SOLID ELECTROLYTE CONSTITUTED BY A CONDUCTIVE VITREOUS COMPOUND

U.S. Pat. No. 4,331,750 and Ser. No. 386,228 describe lithium cells having a solid electrolyte comprising a vitreous compound having the formula $aP_2S_5$, $bLi_2S$, $cLiX$, where X represents chlorine, bromine, or iodine, and where a, b, and c are numbers chosen so that the ratio $b/(a+b)$ lies between 0.61 and 0.70, and so that the ratio $c/(a+b+c)$ is less than or equal to a limit corresponding to the solubility in vitreous phase of LiX in the compound $aP_2S_5$, $bLi_2S$.

A preferred electrolyte for the above-mentioned cells is the following compound:

0,37 $Li_2S$, 0.18 $P_2S_5$, 0.45 LiI.

Advantageously, in addition to an electron conductor, the positive active material comprises between 20% and 80% by volume solid electrolyte.

In practice, the cell may be constituted by a stack of compressed solid electrolyte pellets suitably held between a lithium pellet and a cathode.

However, cells of this type run into problems of ohmic polarisation taking place at the interfaces between the electrodes and the electrolyte, particularly around the negative electrode which adheres to the solid electrolyte in a random and poorly reproducible manner.

Preferred embodiments of the present invention mitigate this drawback.

SUMMARY OF THE INVENTION

The present invention provides a lithium cell including a solid electrolyte constituted by a conductive vitreous compound having the formula $aP_2S_5$, $bLi_2S$, $cLiX$, where X represents chlorine, bromine, or iodine, and where a, b, and c are numbers chosen so that the ratio $b/(a+b)$ lies between 0.61 and 0.70, and so that the ratio $c/(a+b+c)$ is less than or equal to a limit corresponding to the solubility in vitreous phase of LiX in the compound $aP_2S_5$, $bLi_2S$, with the positive active material comprising 20% to 80% by volume solid electrolyte together with an electron conductor, the improvement wherein a substance chosen from the halogens and the chalcogens is included in the electrolyte in order to produce an in situ chemical reaction at the lithium-electrolyte interface, thereby creating an ionically conductive bonding layer comprising a lithium halogenide or chalcogenide.

Although the possibly discontinuous bonding layer thus formed in situ is a poor conductor of ions, it is thin enough not to materially increase the ohmic resistance of the electrolyte.

The thin film of halogenide or chalcogenide thus formed provides electrical connection at the negative electrode interfaces.

It should be observed that coating only the lithium-facing surface of the electrolyte with a thin layer of lithium halogenide or chalcogenide provides no improvement in lithium-electrolyte bonding over having no bonding layer at all.

The bonding is provided by having the halogen or the chalcogen contained in the electrolyte, where it reacts with the lithium which is in direct contact with the electrolyte to form a thin bonding layer in situ. The bonding layer is constituted by a halogenide or a chalcogenide and it may be continuous or discontinuous.

Advantageously, iodine or sulphur are used since their reaction products with lithium, LiI and $Li_2S$, are ionic conductors for lithium ions. The conductivity of LiI at 25° C. is $10^{-7} \Omega^{-1} cm^{-1}$, and the conductivity of $Li_2S$ under the same conditions is $10^{-9} \Omega^{-1} cm^{-1}$. Further, LiI and $Li_2S$ are constituents of the electrolyte whose formula is given above.

Preferred embodiments of the invention use an electrolyte containing 5% to 50% by volume sulphur or iodine.

Preferred positive electrode materials are iodine and sulphur.

BRIEF DESCRIPTION OF THE DRAWINGS

Embodiments of the invention are described by way of example with reference to the accompanying drawings, in which.

MORE DETAILED DESCRIPTION

Figure 1:
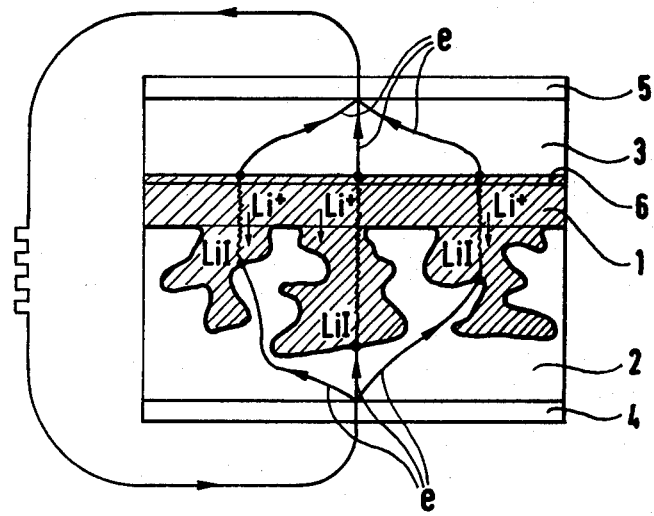
FIG. 1 is a diagrammatic section through a first cell.

FIG. 1 is a diagrammatic cross section and reaction diagram through a cell in accordance with the invention and using the $Li/I_2$ couple.

The solid electrolyte 1 has the formula 0.37 $Li_2S$, 0.18 $P_2S_5$, 0.45 LiI and includes 5% to 50% by volume iodine.

The positive electrode 2 is constituted by a mixture of graphite, solid electrolyte and iodine, and contains 20% to 80% by volume solid electrolyte The negative electrode 3 is made of lithium.

The cathode and anode collectors are respectively referenced 4 and 5.

The lithium iodide bonding layer 6 is formed in situ at the surface of the anode 3 and provides a connection to the vitreous electrolyte 1 while the previously encountered polarisation effects are avoided.

Figure 2:
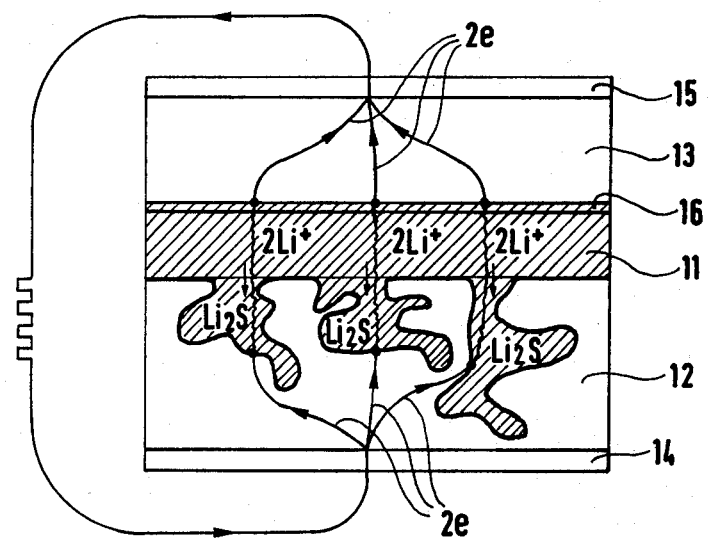
FIG. 2 is a diagrammatic section through a second cell.

FIG. 2 is a diagrammatic cross section and reaction diagram through a cell in accordance with the invention and using the Li/S couple.

The solid electrolyte 11 has the same formula as for the $Li/I_2$ couple and includes 5% to 50% by volume sulphur.

The positive electrode 12 is constituted by a mixture of graphite, solid electrolyte and sulphur. It may be obtained by taking a mixture of graphite and sulphur and heating the mixture to 120° C. to obtain a pasty mixture. The mixture is then cooled and crushed to obtain a graphited sulphur powder which is mixed with the solid electrolyte, e.g., 50% by volume solid electrolyte and 50% by volume graphited sulphur.

The negative electrode 13 is made of lithium. The cathode and anode collectors are referenced 14 and 15 respectively.

The bonding layer of $Li_2S$ formed in situ is referenced 16.

The formation of the bonding layer may be accelerated by heating the cell to around 60° C. to 70° C. after assembly.

Positive electrode materials other than sulphur and iodine could also be used in cells in accordance with the invention.

Nonetheless, such other materials must have working voltages near to or greater than those of the above-mentioned couples, and they must be compatible with the electroactive domain of the medium. In other words, for the Li/$I_2$ couple the voltage must be equal to or only slightly different from the voltage of the couple, while for the Li/S couple the voltage must be equal to or greater than the couple voltage. This is to avoid creating the initially high voltages which would be bound to arise because of the interface between the positive electrode and the electrolyte.

Thus, for example, the positive active material could be copper oxyphosphate $Cu_4O(PO_4)_2$.

The following table lists several possible systems:

TABLE

| Anode | Bonding layer | Middle layer (ES = Solid Electrolyte) | Cathode (gr = graphite) |
|---|---|---|---|
| 1 Li | LiI | ES + $I_2$ | ES + gr + $I_2$ |
| 2 Li | $Li_2S$ | ES + S | ES + gr + S |
| 3 Li | LiI | ES + $I_2$ | ES + gr + $Cu_4O(PO_4)_2$ |
| 4 Li | LiI | ES + $I_2$ | ES + gr + $I_2$ + $Cu_4O(PO_4)_2$ |
| 5 Li | $Li_2S$ | ES + S | ES + gr + $Cu_4O(PO_4)_2$ |
| 6 Li | $Li_2S$ | ES + S | ES + gr + S + $Cu_4O(PO_4)_2$ |

Incorporating sulphur into the positive active material in example 6 can be advantageous for doping the voltage of the Li/$Cu_4O(PO_4)_2$ couple, because of the gain in formation energy recoverable by the formation of CuS (chemical sulphurization of copper) in situ during discharge. In theory the gain should be about 250 mV relative to the Li/$Cu_4O(PO_4)_2$ couple, thus getting close to the voltage of the Li/$I_2$ couple.

We claim:

1. An electric cell having a lithium anode separated from a cathode by a solid electrolyte comprising a conductive vitreous compound having the formula $aP_2S_5$, $bLi_2S$, $cLiX$, where X represents chlorine, bromine, or iodine, and where a, b, and c are numbers chosen so that the ratio $b/(a+b)$ lies between 0.61 and 0.70, and so that the ratio $c/(a+b+c)$ is less than or equal to a limit corresponding to the solubility in vitreous phase of LiX in the compound $aP_2S_5$, $bLi_2S$, with the cathode comprising 20% to 80% by volume solid electrolyte together with an electron conductor, the improvement wherein the electrolyte further comprises a substance selected from the group consisting of the halogens and the chalcogens in order to produce an in situ chemical reaction at the lithium-electrolyte interface, thereby creating an ionically conductive bonding layer comprising a lithium halogenide or chalcogenide.

2. An electric cell according to claim 1, wherein said substance is selected from the group consisting of iodine and sulfur.

3. An electric cell according to claim 2, wherein said substance comprises fom 5% to 50% by volume of the electrolyte.

4. An electric cell according to claim 1, wherein the cathode further comprises at least one positive active material selected from the group consisting of sulfur, iodine, and copper oxyphosphate.

5. An electric cell according to claim 4, wherein the positive active material comprises a mixture of iodine and copper oxyphosphate.

6. An electric cell according to claim 4, wherein the positive active material comprises a mixture of sulfur and copper oxyphosphate.

7. An electric cell according to claim 1, wherein the conductive vitreous compound of the electrolyte has the formula 0.37 $Li_2S$, 0.18 $P_2S_5$, 0.45 LiI.

* * * * *